United States Patent
Sellappa et al.

(10) Patent No.: US 11,582,151 B2
(45) Date of Patent: Feb. 14, 2023

(54) AVOIDING RECIRCULATION OF DATA PACKETS IN A NETWORK DEVICE

(71) Applicant: Arista Networks, Inc., Santa Clara, CA (US)

(72) Inventors: Sriram Sellappa, Santa Clara, CA (US); Song Yuan, Cupertino, CA (US)

(73) Assignee: Arista Networks, Inc., Santa Clara, CA (US)

( * ) Notice: Subject to any disclaimer, the term of this patent is extended or adjusted under 35 U.S.C. 154(b) by 263 days.

(21) Appl. No.: 17/101,218

(22) Filed: Nov. 23, 2020

(65) Prior Publication Data

US 2021/0075725 A1 Mar. 11, 2021

Related U.S. Application Data

(63) Continuation of application No. 16/517,392, filed on Jul. 19, 2019, now abandoned.

(51) Int. Cl.
| | |
|---|---|
| *H04L 45/741* | (2022.01) |
| *H04L 61/251* | (2022.01) |
| *H04L 45/745* | (2022.01) |
| *H04L 101/35* | (2022.01) |

(52) U.S. Cl.
CPC .......... *H04L 45/741* (2013.01); *H04L 45/745* (2013.01); *H04L 61/251* (2013.01); *H04L 2101/35* (2022.05)

(58) Field of Classification Search
None
See application file for complete search history.

(56) References Cited

U.S. PATENT DOCUMENTS

| | | | | |
|---|---|---|---|---|
| 7,536,476 | B1 * | 5/2009 | Alleyne | H04L 45/00 726/13 |
| 7,546,635 | B1 * | 6/2009 | Krohn | H04L 63/0254 709/224 |
| 7,760,636 | B1 * | 7/2010 | Cheriton | H04L 47/30 370/235 |
| 9,819,587 | B1 * | 11/2017 | Tracy | H04L 45/7453 |
| 10,135,734 | B1 * | 11/2018 | Singh | H04L 45/7453 |
| 10,708,222 | B1 * | 7/2020 | Bean | H04L 61/5014 |
| 2002/0062388 | A1 * | 5/2002 | Ogier | H04L 69/167 709/238 |
| 2005/0129019 | A1 * | 6/2005 | Cheriton | H04L 63/08 709/240 |

(Continued)

*Primary Examiner* — Christopher T Wyllie
(74) *Attorney, Agent, or Firm* — Fountainhead Law Group PC

(57) ABSTRACT

In one embodiment, a method is provided. The method includes receiving a data packet via an ingress interface of the network device. The method also includes determining whether the data packet comprises an Internet Protocol version 4 (IPV4) or an Internet Protocol version 6 (IPV6) packet. The method further includes in response to determining that the packet comprises an IPV4 packet, identifying a first entry in an adjacency table. The first entry is associated with an address prefix. The address prefix is associated with first Internet Protocol (IP) address of the data packet. The first entry indicates a next hop for the data packet. The adjacency table comprises a second entry associated with the address prefix. The method further includes forwarding the packet to the next hop indicated by the first entry in the adjacency table, via an egress interface of the network device.

20 Claims, 9 Drawing Sheets

(56) References Cited

U.S. PATENT DOCUMENTS

| | | | |
|---|---|---|---|
| 2007/0150614 A1* | 6/2007 | Ramachandran | H04L 63/101 709/238 |
| 2010/0080225 A1* | 4/2010 | Nordmark | H04L 45/00 370/392 |
| 2010/0150020 A1* | 6/2010 | Rosen | H04L 45/22 370/254 |
| 2010/0316052 A1* | 12/2010 | Petersen | H04L 45/742 370/392 |
| 2011/0320632 A1* | 12/2011 | Karino | H04L 45/38 709/238 |
| 2012/0323381 A1* | 12/2012 | Yadav | H04L 63/0236 700/286 |
| 2014/0153573 A1* | 6/2014 | Ramesh | H04L 45/748 370/392 |
| 2014/0156667 A1* | 6/2014 | Kapadia | G06F 16/901 707/741 |
| 2014/0219279 A1* | 8/2014 | Gross | H04L 1/0029 370/392 |
| 2015/0098470 A1* | 4/2015 | Sun | H04L 45/748 370/392 |
| 2015/0163140 A1* | 6/2015 | Rovner | H04L 45/745 370/392 |
| 2017/0142013 A1* | 5/2017 | Zhang | H04L 45/74591 |
| 2017/0195181 A1* | 7/2017 | Birmiwal | H04L 41/12 |
| 2017/0214618 A1* | 7/2017 | Banerjee | H04L 45/741 |
| 2017/0310589 A1* | 10/2017 | Tambakuwala | H04L 61/25 |
| 2018/0109454 A1* | 4/2018 | Holmberg | H04L 45/748 |
| 2019/0182135 A1* | 6/2019 | Bharadwaj | H04L 67/1097 |
| 2021/0021517 A1* | 1/2021 | Sellappa | H04L 45/741 |

* cited by examiner

AVOIDING RECIRCULATION OF DATA PACKETS IN A NETWORK DEVICE

CROSS-REFERENCE TO RELATED APPLICATION

This application is a continuation of U.S. patent application Ser. No. 16/517,392, filed Jul. 19, 2019, which is hereby incorporated by reference herein in its entirety.

BACKGROUND

A network device may be a device (e.g., a computing device, an electronic device etc.) capable of communicating data with other devices through a wired or wireless connection or set of connections. For example, a network device may receive data from a first device (e.g., a computing device, a switch, a router, etc.) and may forward the data to a second device (e.g., a computing device, a switch, a router, etc.). A network device may include various types of hardware that may be used to transmit and/or receive data. For example, a network device may include line cards and each line card may include one or more processing devices (e.g., application specific integrated circuits (ASICs), field programmable gate arrays (FPGAs), processors, central processing units, forwarding engines, etc.) to transmit and/or receive data (e.g., network packets).

SUMMARY

In some implementation a method is provided. The method includes receiving a data packet via an ingress interface of the network device. The method also includes determining whether the data packet comprises an Internet Protocol version 4 (IPV4) or an Internet Protocol version 6 (IPV6) packet. The method further includes in response to determining that the packet comprises an IPV4 packet, identifying a first entry in an adjacency table. The first entry is associated with an address prefix. The address prefix is associated with first Internet Protocol (IP) address of the data packet. The first entry indicates a next hop for the data packet. The adjacency table comprises a second entry associated with the address prefix. The method further includes forwarding the packet to the next hop indicated by the first entry in the adjacency table, via an egress interface of the network device.

In some implementations, a network device is provided. The network device includes a memory to store data and a processing device coupled to the memory. The processing device to receive a data packet via an ingress interface of the network device. The processing device is also to determine whether the data packet comprises an Internet Protocol version 4 (IPV4) or an Internet Protocol version 6 (IPV6) packet. The processing device is further to in response to determining that the packet comprises an IPV4 packet, identify a first entry in an adjacency table. The first entry is associated with an address prefix. The address prefix is associated with first Internet Protocol (IP) address of the data packet. The first entry indicates a next hop for the data packet. The adjacency table comprises a second entry associated with the address prefix. The processing device is further to forward the packet to the next hop indicated by the first entry in the adjacency table, via an egress interface of the network device.

In some implementations, a non-transitory machine-readable medium is provided. The non-transitory machine-readable medium has executable instructions to cause one or more processing devices to perform a method. The method includes receiving a data packet via an ingress interface of a network device. The method also includes determining whether the data packet comprises an Internet Protocol version 4 (IPV4) or an Internet Protocol version 6 (IPV6) packet. The method further includes in response to determining that the packet comprises an IPV4 packet, identifying a first entry in an adjacency table. The first entry is associated with an address prefix. The address prefix is associated with first Internet Protocol (IP) address of the data packet. The first entry indicates a next hop for the data packet. The adjacency table comprises a second entry associated with the address prefix. The method further includes forwarding the packet to the next hop indicated by the first entry in the adjacency table, via an egress interface of the network device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a network device may be a device (e.g., a computing device, an electronic device, etc.) that may communicate data with other devices (e.g., may receive data from a first device and may forward the data to a second device. A network device may include a control plane and a data plane. A control plane may process control information and write configuration data used to manage and/or configure the data plane. The control plane may also perform control management updates and/or respond with control message responses (e.g., routing decisions, protocol updates, traffic resolutions, etc.). The data plane receives, processes, and forwards network data based on the configuration data, as discussed in more detail below.

In some embodiments, the network device may use ACLs to determine how to analyze, process, and/or forward data packets. For example, a forwarding engine (of the network device) may use one or more ACLs to determine whether a type of packet may be forwarded to a next hop (e.g., an egress interface). ACLs may also be applied to different types of interfaces, packets, and/or routes. For example, an ACL may be applied to IPV4 packets/routes, IPV6 packets, routes, etc. A forwarding engine and/or a network device may not be able to support and/or use different types of ACLs. For example, the forwarding engine may not be able to support an IPV6 egress ACL or apply an IPV6 ACL on the egress pipeline. The forwarding engine may forward a data packet to a recirculation port to provide the data packet back to the ingress pipeline of the forwarding engine. The forwarding engine may use the IPV6 egress ACL in the ingress pipeline to analyze and/or process the data packet. If the network device allows IPV6 next hops to be used and/or advertised for both IPV4 routes and IPV6 routes. The network device and/or forwarding engine may unnecessarily recirculate IPV4 packets, as discussed in more detail below. Unnecessarily recirculate IPV4 packets may cause the network device to process and/or forward data packets less efficiently and/or more slowly.

Figure 1:
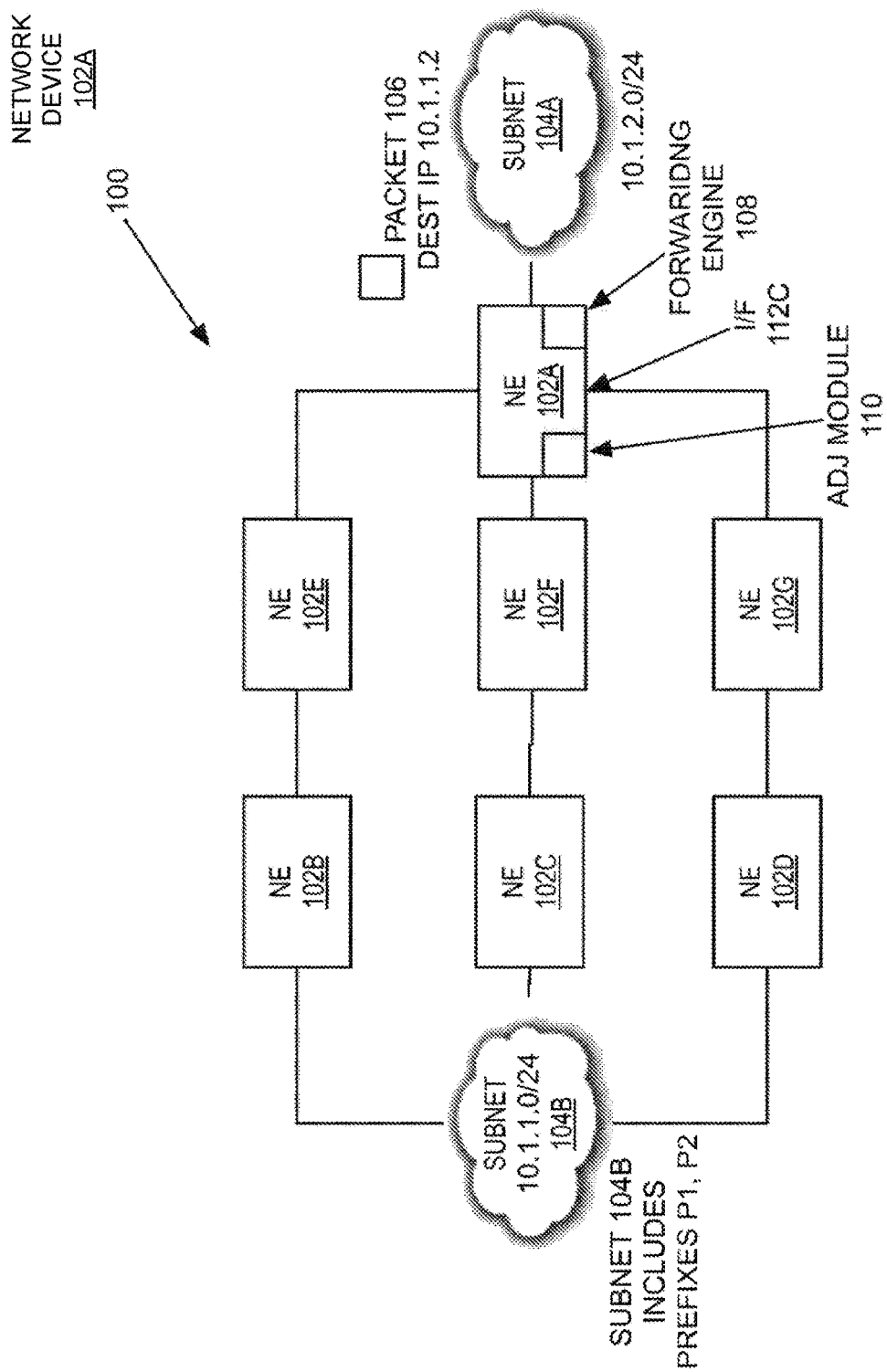
FIG. 1 is a block diagram of an example system that includes a network device communicating network data between a network and a number of devices, in accordance with some embodiments.

FIG. 1 is a block diagram of an example network system 100, in accordance with some embodiments. The network system 100 may include different paths between different subnets. In FIG. 1, the network system 100 includes network devices 102A-G that are coupled to subnets 104A-B. In one embodiment, each of the subnets is represented by one or more prefixes. In one embodiment, subnet 104A-E is a portion of the network. For example and in one embodiment, a subnet is a network portion defined by a range of network addresses, such as 10.1.2.0/24. In this example, subnet 104A is represented by the network address 10.1.2.0/24, which gives a range of addresses from 10.1.2.1-10.1.2.255 for subnet 104C. A subnet can be as little as one address or may have thousands or even millions of addresses. A prefix for a subnet is a network address that includes one or more actual addresses. For example and in one embodiment, a prefix can be one address (e.g., 168.1.1.1) or a range of two or more addresses (e.g., 168.1.1.2/31 or 168.1.1.0/24).

In one embodiment, each network device 102A-G is a network device that allows network access from one subnet to another. For example and in one embodiment, a network device 102A-G can be a router, switch, or another type of network device that allows network access from one subnet to another. In one embodiment, the network device can be a virtual or physical network device.

As illustrated in FIG. 1, subnets 104A-B are coupled via network devices 102A-G. In FIG. 1, there can be multiple paths between the two subnets 104A-B. For example and in one embodiment, there are three different paths between subnets 104A-B and subnet 104A. The first path is through network devices 102A, 102E, and 102B. The second path is via network devices 102A, 102F, and 102C. The third path is via network devices 102A, 102G, and 102D. In this example, each of the different paths will have a cost associated for forwarding a packet. These costs can be the same or different. If the costs are the same, and network device can choose to send a packet using the same or different paths. For example and in one embodiment, if a packet 106 was being sent from subnet 104A with the destination Internet protocol (IP) address of 10.1.1.2 in subnet 104B, the network device 102A can have a choice as to which interface would be used to transmit packet 106. Network device 102A can either send the packet 106 via network devices 102E-G. Each of these paths will eventually lead to subnet 104B. If the paths have equal cost, it does not matter which path is chosen as the packet will arrive at approximately the same time.

Because there can be multiple equal cost paths to a subnet, the network device 102A can use equal-cost multi-path routing (or equal-cost path (ECMP)). As described above, ECMP is a routing strategy where next-hop packet forwarding to a single destination can occur over multiple "best paths" which tie for top place in routing metric calculations. Many different routing protocols support ECMP (e.g., Open Shortest Path First (OSPF), Intermediate System to Intermediate System (ISIS), and Border Gateway Protocol (BGP)). ECMP can allow some load balancing for data packets being sent to the same destination, by transmitting some data packets through one next hop to that destination and other data packets via a different next hop. The network device 102A that uses ECMP makes ECMP decisions for various data packets of which next hop to use based on which traffic flow that data packet belongs to. In one embodiment, the network device 102A determines whether to send packets, such as packet 106, via next hop network devices 102E-G to subnet 104B. In FIG. 1, subnet 104B has equal cost paths from subnet 104A.

In FIG. 1, network devices 102B-D are protocol peers to network device 102A. In one embodiment, a protocol peer is a pair of network devices (e.g., network devices 102A-B, 102A & C, and 102A & D) that form a control plane protocol interconnection to exchange routes (or prefixes) known to each other. The peers may or may-not be directly connected to each other. For example and in one embodiment, for BGP, it is possible that peer routers have other routers separating them. In this example, network devices 102A-B can establish BGP peering without being directly connected (e.g. network device 102E is in-between network devices 102A-B). Alternatively, protocol peers can be directly connected to each other. For example and in one embodiment, network devices 102B-D are each BGP peers with network device 102A, network devices 102E-G are the respective intermediates for those protocol peers, respectively. In this example, the network devices 102B-D would advertise reachability to prefixes of subnet 104B known to the network devices 102B-D. Thus, as far as network device 102A is concerned, the prefixes in subnet 104B are reachable via network devices 102B-D. In this example, the three different routes with three different BGP next hops is an ECMP route. This can be represented as three different BGP next hops to one subnets with prefix P: P→102B, 102C, 102D.

However, in the forwarding information base (FIB), the network device 102A programs adjacencies in terms of immediately connected routers. In one embodiment, the FIB is programmed in hardware. Thus, the network device 102A further resolves network devices 102B-D to its immediately connected routers and program that information into the FIB. Further resolving a peer to a nearest neighbor is called recursive resolution. Thus, the above route becomes: P→102E, 102F, 102G. In addition, a FIB and RIB can also include prefix entries for other subnets as well.

In one embodiment, the protocol table (also known as RIB—Routing information base) would contain the unresolved next hop (e.g., 102B-D) and the FIB would contain the recursively-resolved next hops in the adjacency (e.g., 102E-G).

As described above and in one embodiment, the network device 102A further includes a forwarding engine 108. In one embodiment, the forwarding engine 108 includes a forwarding table (described further below) that the forwarding engine 108 uses to determine which interfaces 112A-C should be used to transmit the packet 106. In one embodiment, the forwarding engine 108 performs an address lookup using the forwarding table for the packet destination address to determine a next hop for the packet. In one embodiment, the forwarding engine includes a LPM table that matches prefixes to addresses and an adjacency table that lists next hops. The LPM table includes prefix entries (e.g., a prefix is a range of one or more IP addresses) and a corresponding entry in the adjacency table. The content of packet 106 has a destination IP address that matches to one of the prefixes in the LPM table. The process of looking up the destination IP address in packet 106 involves finding out which prefix to best use, in order to reach the destination IP address. Once the prefix (one from the many in the LPM table) is determined, the adjacency information (next hop router and interface) corresponding to that prefix is obtained. The LPM and adjacency tables are further described below.

In one embodiment, a similar concept can be used for maintaining the adjacency table. In this embodiment, the adjacency module 110 maintains a next hop list cache 114. An NHLIST is a data structure comprising of protocol announced (e.g., BGP announced or some other protocol that announces peers) next hops for a given prefix. For example and in one embodiment, from the example described above, the prefix P was advertised by two BGP peers, the NHLIST for prefix P would be (102B, 102C, 102D). This NHLIST is further decomposed (by recursive-resolution) to obtain a result of (102E, 102F, 102G). If this decomposed result can be saved against this NHLIST, then any subsequent prefix, say P1, which gets advertised by the same set of peers and which have the same protocol NHLIST, can make use of the cached result above and the adjacency module 110 does not re-compute the recursively resolved next hops. So, for example, if P1 were to have a NHLIST of (102B, 102C, 102D), the protocol would simply have to lookup against the cache and obtain the cache entry (102E, 102F, 102G) and program that to the FIB. While in one embodiment, a three-way ECMP as illustrated in FIG. 1 may not have significant computation saving, as ECMP groups get larger and larger, the computation saving increase. For example and in one embodiment, the computation savings are significant if there is a 256-way ECMP path with 50,000 prefixes sharing the same NHLIST.

When the network topology changes, the adjacency should be updated accordingly. For example, when the network topology changes due a new next hop for subnet being discovered, a peer going down, or a peer going up, the forwarding information needs to be updated due to this change. Previously, for each notification of the network topology change, the network device deletes the current forwarding information and rebuilds the forwarding information from scratch. In addition, for each topology change, the network device may advertise the change through a routing protocol running on the network device. If there are a lot of topology changes, this rebuilding and advertising of can create a lot of churn in the network device as the network device makes the changes and advertises those changes to other network devices or peers.

Instead of rebuilding the forwarding information from scratch, the network device 102A updates the forwarding information based on the types of topology change that is detected by the network device 102A. For example and in one embodiment, if the topology change is new prefix advertisement, the network device 102A determines the next hop list for the new subnet prefix and updates the adjacency table.

Figure 2:
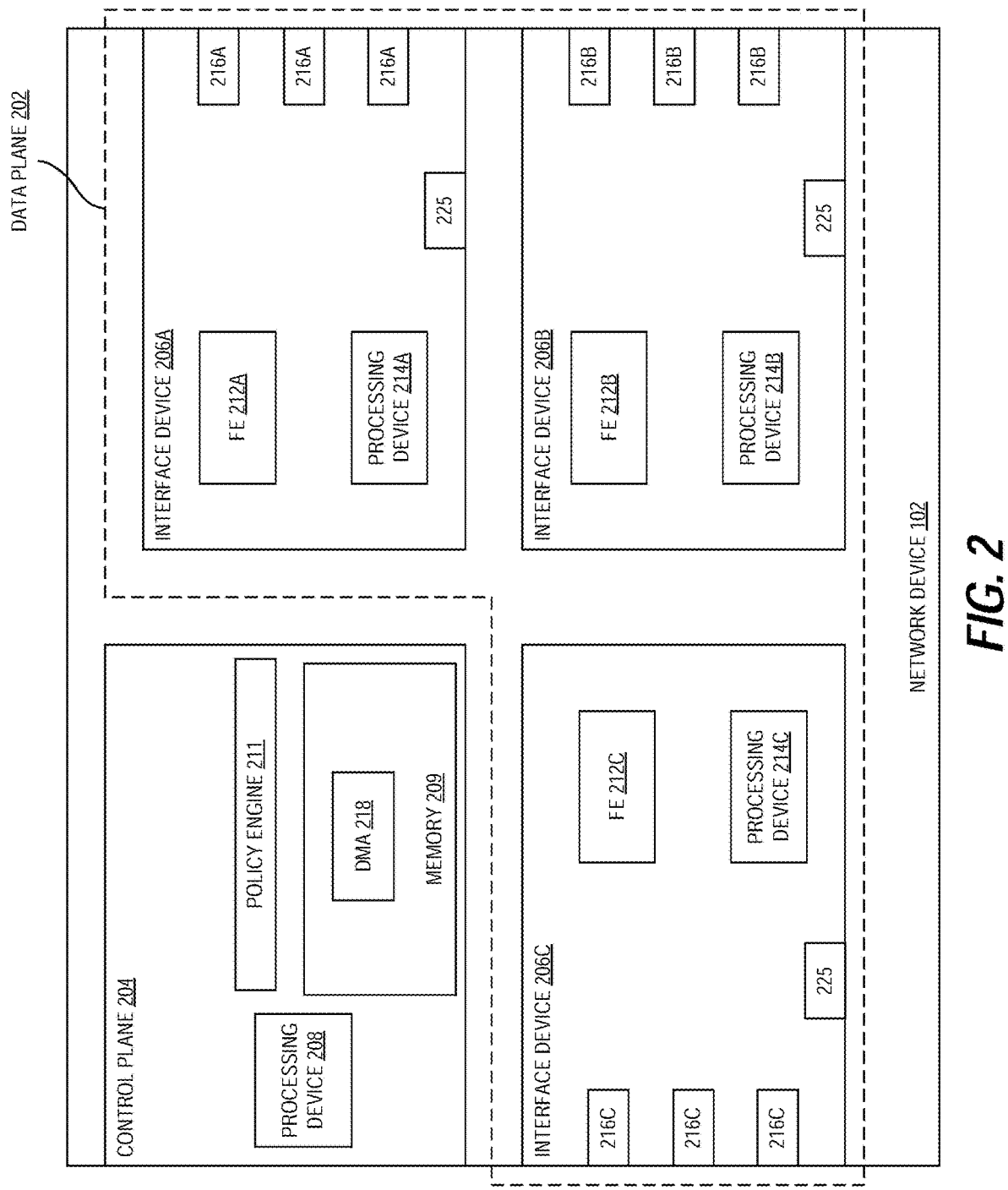
FIG. 2 is a block diagram of an example network device including a data plane coupled to a control plane and several interface devices, in accordance with some embodiments.

FIG. 2 is a block diagram of an example network device 102 that includes a data plane 202 coupled to a control plane 204 and several interface devices 206A-C, in accordance with some embodiments. In some network devices, data plane 202 is referred to as the forwarding plane. In one embodiment, the illustrated network device 102 is a variant of the network device 102 of FIG. 1. In one embodiment, control plane 204 includes central processing unit (CPU) 208 and memory 209 to store data. Processing device 208 is used to process information for control plane 204 and writes configuration data for forwarding engines 212A-C in interface devices 206A-C. Additionally, processing device 208 can read data from the forwarding engines 212A-C. In one embodiment, data plane 202 receives, processes, and forwards network data using various configuration data (e.g., forwarding, security, quality of service (QoS), and other network traffic processing information). Data plane 202 includes multiple network interface devices 206A-C (e.g., line cards, etc.) that can each receive, process, and/or forward network traffic. Each of interface devices 206A-C includes multiple ports 216A-C that are used to receive and transmit network data. Each of the interface devices 206A-C may also include a recirculation port 225. A recirculation port may be a port is used to forward data back into a respective interface device. For example, a recirculation port 225 may be a port that forwards data back to an ingress interface/pipeline of a respective interface 206A-C. In one embodiment, the recirculation port 225 may be a virtual port (e.g., may not be a physical port, a front panel port, etc.). Although one recirculation port 225 is illustrated for each of the interface devices 206A-C, different numbers of recirculation ports 225 may be used in other embodiments. For example, each interface device 206A-C may include multiple recirculation ports 225.

In one embodiment, for each received unit of network data, data plane 202 determines a destination address for the network data, looks up the requisite information for that destination in one or more tables stored in the data plane, and forwards the data out the proper outgoing interface, for example, one of interface devices 206A-C. In one embodiment, each interface device 206A-C includes one or more forwarding engines (FE(s)) 212A-C, processing device 214A-C, and ports 216A-C, respectively. Each forwarding engine 212A-C forwards data for the network device 102, performing routing, switching, or other types of network forwarding. The forwarding engines 212A-C may also be referred to as hardware forwarding engines (HWFEs). Each processing device 214A-C can be used to accelerate various functions of interface devices 206A-C. For example and in one embodiment, processing devices 214A-C can be configured to program corresponding forwarding engines 212A-C. Processing devices 214A-C can also push data from forwarding engines 212A-C to a processing device 208 in control plane 204.

In one embodiment, control plane 204 gathers the configuration data for forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to forwarding engines 212A-C.

In one embodiment, the memory 209 that is used to store data for control plane 204 is shared with data plane 202. In such embodiment a direct memory access (DMA) controller 218 is coupled to memory 209 to allow processing devices 214A-C direct access to memory 209. In one embodiment, DMA controller 218 allows processing devices 214A-C to directly access the memory 209 without requiring processing device 208 in control plane 204 to send data to each processing device 214A-C. In one embodiment, control plane 204 includes a policy engine 211 to apply a QoS policy to network traffic flowing through network device 102. Policy engine 211 can be configured to minimize the latency of some type of network traffic, or to apply traffic shaping policies on the overall flow of traffic through the network device, or within a larger network topology. Proper determination of real-time latency data within the network can be key to the implementation of effective QoS policy. In one embodiment, logic to perform the timing of network data flow is consolidated into the hardware of data plane 202 of each network device 102.

Figure 3:
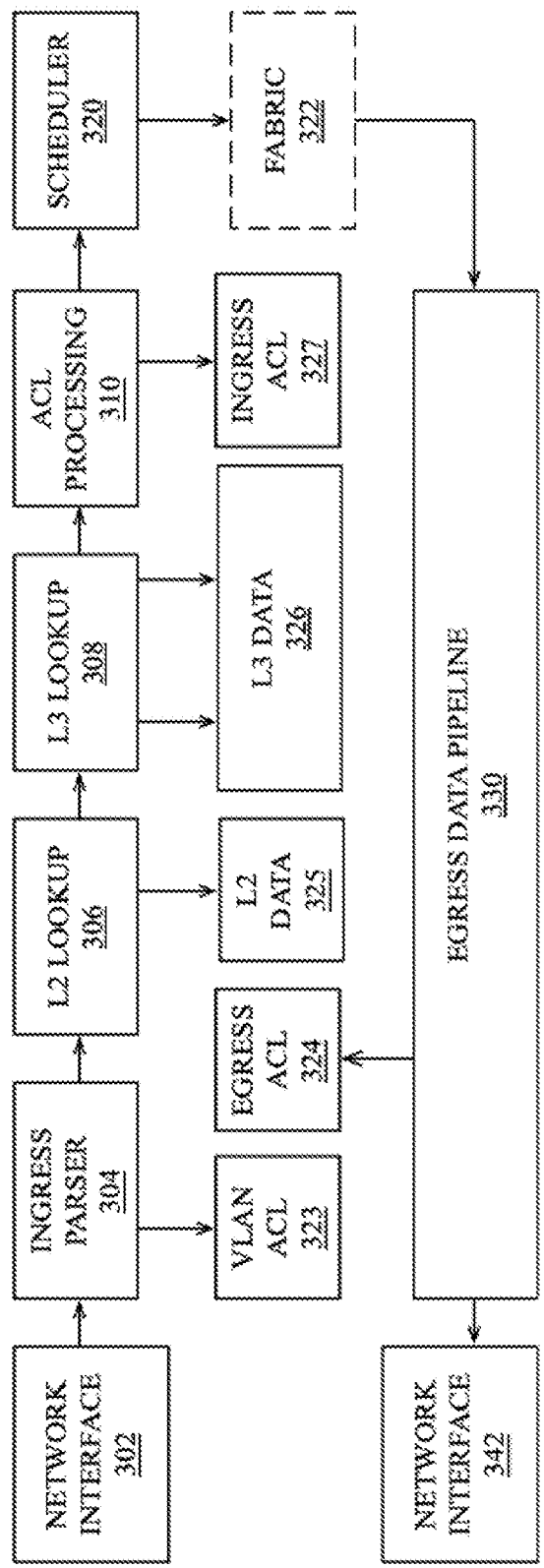
FIG. 3 is a block diagram of an example forwarding pipeline a network device, in accordance with some embodiments.

FIG. 3 is a block diagram of an example forwarding pipeline 300 within a network device, in accordance with some embodiments. In one embodiment, the forwarding pipeline 300 resides in a forwarding engine (e.g., FE 212), which includes logic from one or more of FE(s) 212 within each interface 206 shown in FIG. 2. FIG. 3 focuses primarily on the ingress aspects of the forwarding pipeline 300, where the relevant logic of the various embodiments resides. As illustrated, the forwarding pipeline 300 includes an ingress network interface 302, an ingress parser 304, a data-link layer lookup (e.g., L2 lookup 306), a network layer lookup (e.g., L3 lookup 308), an access control list (ACL) processing block 310, and a scheduler 320.

In one embodiment, access control lists (ACLs) including a VLAN ACL 323, Ingress routed ACL and QOS ACL or policy based routing 327, and Egress ACL 324 allow policy and filtering actions to be performed on network data at multiple stages within the forwarding pipeline 300. The ACLs store an ordered list of rules that define access restrictions for entities of the network device, including a specified network interface (e.g., ingress network interface 302, egress network interface 342). In one embodiment, network data may be forwarded to the control plane of the network device, and an ACL can be configured to specify access restrictions to the control plane. The ACL rules specify the data to which fields of network data are compared.

In one embodiment forwarding pipeline 300 is configured to forward units of network data that match all conditions in a permit rule and to drop units of network data that match all conditions in a deny rule. For some ACLs, the forwarding pipeline is configured to implicitly deny (e.g., drop) units of network data that do not match at least one rule. Upon arrival at ingress network interface 302, a unit of network data is processed based one or more ingress ACLs associated with network interface 302 (e.g., VLAN ACL 323, Ingress ACL 327). In one embodiment, the network data can be additionally processed based on egress ACL 324 before being forwarded via egress network interface 342. In one embodiment, the ACLs can be used to perform actions other than permit and deny. For example, an access control entry may be specified which sets a traffic class for a unit of network data or sets a next hop for a unit of network data or a policer to be applied to the networks data.

If a unit of network data is permitted through ACL processing, a forwarding decision can be made for the data. The L2 data 325 and L3 data 326 modules store various tables used to perform data-link layer (layer 2) and network layer (layer 3) forwarding of network data by the forwarding pipeline 300. In one embodiment, after processing and forwarding operations are performed by ingress elements of the forwarding pipeline, scheduler 320 forwards ingress network data to a fabric module 322, which provides data-plane connectivity between multiple packet processors in the network device. In one embodiment, a single chip solution is used for the ingress and egress pipelines of forwarding pipeline 300, omitting fabric module 322. Either through fabric module 322 or via a scheduling engine, scheduler 320 can forward the ingress network data to egress data pipeline 330 for egress processing once the set of forwarding decisions have been made. The egress data, after processing by egress data pipeline 330, is re-transmitted via an egress network interface 342. Egress data pipeline 330 can operate in parallel with other elements of the forwarding pipeline 300 described herein.

In one embodiment, forwarding operations for a unit of network data proceeds as follows. First, the network data is received by an ingress network interface 302. For embodiments including Ethernet interfaces, network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical) interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network device. This operation can include performing error checking and finding the start and end delimiters for the unit of network data. In one embodiment, while the entire unit of network data is received at the MAC/PHY layer only header data is sent through to the remainder of forwarding pipeline 300.

In one embodiment, headers for the unit of network data are parsed at an ingress parser 304, which extracts key fields used to make forwarding decisions. For a typical unit of Internet Protocol version 4 (IPv4) network data, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the unit of network data. Where the unit of network data has arrived via a trunk port, the VLAN ID can be determined based on a VLAN header. When the unit of network data arrives via an access port or arrived untagged, the VLAN ID may be determined based on the port configuration.

In one embodiment, once ingress parser 304 is aware of the VLAN ID and ingress interface ingress parser 304 verifies the spanning tree protocol (STP) port state for the receiving VLAN. In one embodiment, the network device supports the rapid spanning tree protocol (RSTP). If the port STP/RSTP state indicates that the unit of network data should be forwarded (e.g., blocking, listening, discarding, learning, etc.) the unit of network data is dropped. If the STP/RSTP state is learning, the MAC address table is populated with information from the unit of network data and the unit of network data is dropped. If the port STP state is forwarding, then the headers for the unit of network data are allowed to proceed down the pipeline.

In one embodiment, ingress parser 304 can perform a further comparison for the unit of network data against any configured Port ACLs by performing a lookup in the VLAN ACL 323. If the unit of network matches a DENY statement, the unit will be dropped. If the unit of network data matches a PERMIT statement, or no port ACL is enabled, the unit of network data is passed to the next block of the pipeline. Successive stages include L2 lookup 306 and an L3 lookup 308 stages. L2 lookup 306 stage will reference L2 data 325, which may be a MAC address table, which is an exact-match table. L3 lookup 308 will reference L3 data 326, which includes an exact-match table that contains /32 IPv4 and /128 IPv6 host routes, and a longest-prefix match (LPM) table that contains IPv4 and IPv6 routes that are not host routes. In some embodiments, the LPM table may also include /32 IPv4 and /128 IPv6 host routes. For example, the /32 IPv4 and /128 IPv6 host routes may be in the LPM table, rather than an exact-match table. In another example, the /32 IPv4 and /128 IPv6 host routes may be in both the exact-match table and the LPM table.

Figure 4A:
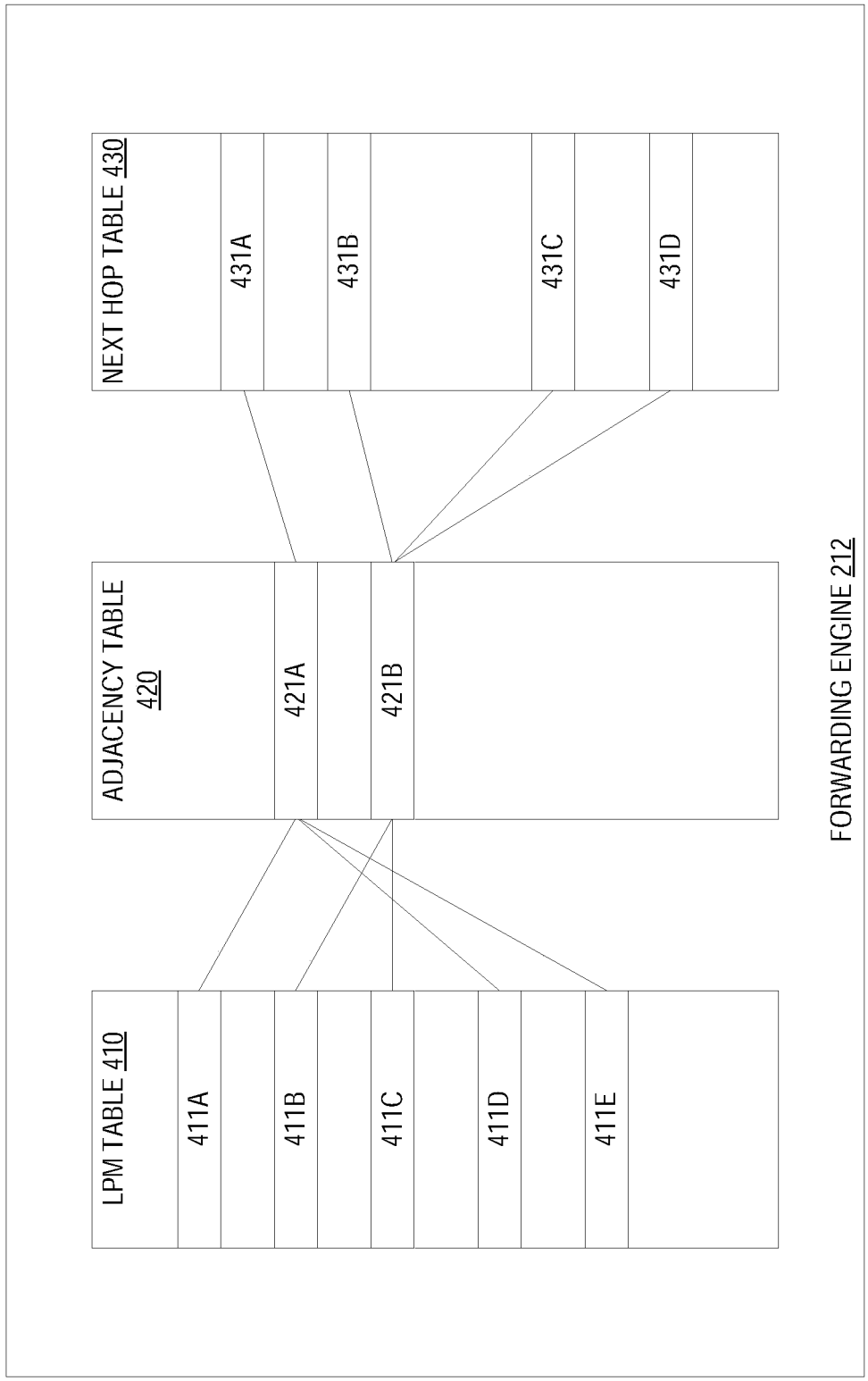
FIG. 4A is a block diagram of an example forwarding engine that includes a longest prefix match table and an adjacency table, in accordance with some embodiments.

FIG. 4A is a block diagram of one embodiment of a forwarding engine 212 that includes a longest prefix match (LPM) table 410, an adjacency table 420, and a next hop table 430, in accordance with some embodiments. Although the LPM table 410, the adjacency table 420, and the next hop table 430 are illustrated as part of the forwarding engine 212, one or more of the LPM table 410, the adjacency table 420, and the next hop table 430 may be separate from the forwarding engine 212. For example, one or more of the LPM table 410, the adjacency table 420, and the next hop table 430 may be stored in a memory (e.g., a cache, random access memory, flash memory, etc.) that is separate from the forwarding engine 212.

As discussed above, a network device (e.g., network device 102A illustrated in FIG. 1) may receive a packet (e.g., a data packet, a frame, a message, an IP packet, etc.) via an ingress interface. The incoming packet may have a destination Internet Protocol (IP) address. The network device hardware may identify an entry in the LPM table 410 based on the incoming packet's IP address. This may indicate or yield an index into the adjacency table 420. The adjacency table 420 includes information about how to send the packet out of the network device. In one embodiment, the adjacency table 420 may include a plurality of entries. The entries may be referred to as adjacency entries, adjacencies, adjacency sets, etc. Each entry in the adjacency table 420 may indicate one or more egress interfaces on which a packet should to be sent and/or one or more next hop network devices (e.g., an attached neighboring network device) to which the packet should to be sent in order for it to reach its destination (e.g., a destination network or a destination device). For example, an entry in the adjacency table 420 may include information to reach an immediate neighbor (e.g., another network device that is attached directly to this network device via the network). The LPM table 410 also includes a plurality of entries. The entries in the LPM table 410 may be referred to as route entries, LPM entries, etc. Each entry in the LPM table 410 may indicate a prefix (e.g., a network prefix, a network address prefix, an IP address prefix, an address prefix, etc.) that this network device knows about and that the adjacency table 420 has adjacencies that are obtained from the FIB created by the control plane of the network device.

In one embodiment, the LPM table 410 may include entries 411A-E. Each of the entries 411A-E may indicate an address prefix and/or one or more routes that may be associated with the address prefix (e.g., prefix). Each of the routes indicated in the LPM table 410 (e.g., indicated by entries 411A-E) may reference one of the entries 421A-B in the adjacency table 420. The entries 421A-B may reference one or more next hops indicated in the entries 431A-D of the next hop table 430. In one embodiment, each of the entries 421A-B may include a set of one or more adjacencies for a prefix. In addition, each of the entries 421A-B may include a size of this set (e.g., how many adjacencies there are for a prefix). As illustrated in FIG. 2, entries 411A, D, and E (of the LPM table 410) reference entry 421A (of the adjacency table 420) and entries 411B-C (of the LPM table) reference entry 421B (of the adjacency table 420). In addition, entry 421A (of the adjacency table 420) references entry 431A (of the next hop table 430). In this example, entry 421A has one next hop. Furthermore, entry 421B references entries 431B-D. This may indicate a 3-way ECMP for entry 421B. For example, the network device may use the next hop indicated in entry 431A to transmit packets with destination addresses for a prefix in one of the routes 411A, 411D, and 411E. The network device may use one of the next hops indicated in the entries 431B-D to transmits packets with destination addresses for a prefix in one of the indicated by entries 411B-C. Each next hop entry 431A-D may include an outgoing interface of the adjacent network device, such as the MAC address of the adjacent network device.

In one embodiment, the LPM table 410 may get large because the network device may learn and/or detect a large number of prefixes. On the other hand, the adjacency table 420 may be much smaller because the adjacency table is on the order of the number of directly attached neighboring network devices (which may be based one and/or equal to the number of interfaces on this network device). In addition, the next hop table 430 may also be based one and/or equal to the number of active interfaces on the network device. Thus, it may be useful, beneficial, and/or more efficient for the network device to operate and/or work in the order of the number of adjacencies as opposed to the number of prefixes, because the number of adjacencies may be up to several orders of magnitude smaller. For example, the number of adjacencies may be 50, 100, or some other appropriate number, and the number of prefixes can be 1000, 20000, 50000 or some other appropriate number. In one embodiment, an adjacency for a single route may include and/or indicate the next hop information (e.g., one interface and peer router address) or an adjacency may include and/or indicate an ECMP route with multiple interfaces and peer network device addresses.

In one embodiment, a beneficial use of the indirection in the adjacency table 420 allows a network device to dynamically resize, modify, change, update, etc., a particular entry (e.g., a particular adjacency, adjacency set, etc.), without changing the entries in the LPM table 410. In addition, by retaining the same reference from the entries in the LPM table 410 to the adjacency table, and allocating a new consecutive block (of the required size) in the next hop table, the network device updates the adjacency set table entry.

This allows for the in-place updates to the adjacency table 420 (e.g., in-place adjacency updates to the entries of the adjacency table 420) without updating, modifying, changing, etc., the routes in the LPM table 410. In this embodiment, the notion of in-place updates to the adjacency table 420 may allow for more efficient in the control plane of the network device, because network topology updates may be propagated more quickly and/or efficiently to the forwarding engine 212.

In some embodiments, the network device may allow IPV6 next hops to be used and/or advertised for both IPV4 routes and IPV6 routes. This allows an IPV4 route to include an IPV4 next hop or an IPV6 next hop. For example, entry 411D may indicate a prefix for an IPV4 route and entry 411E may indicate a prefix used for an IPV6 route. The network device may allow IPV6 next hops to be used and/or advertised for both IPV4 routes and IPV6 routes to support Request for Comment (RFC) 5549 (e.g., RFC 5549). The network device may use the same entry in the adjacency table 420 for both the IPV4 and IPV6 routes. For example, entry 421B may be used to indicate the next hop for both IPV4 routes and IPV6 routes. Due to the sharing of the same entry in the adjacency table 420, the forwarding behavior of the forwarding engine 212 may be the same for both the IPV4 route and the IPV6 route. For example, because entries 411D and 411E share the same entry 421A, the packets received from the address that are covered by the prefixes indicated in the entries in 411D and 411E will be sent to the next hop indicated by the entry 431A (e.g., to the network interface and/or network device indicated by the entry 431A).

In some embodiments, the network device may use ACLs to determine how to analyze, process, and/or forward data packets. For example, the forwarding engine 212 (of the network device) may use one or more ACLs to determine whether a type of packet may be forwarded to a next hop (e.g., an egress interface). In another example, the forwarding engine may use one or more ACLs to determine whether a packet with a certain source address should be forwarded to a next hop. An ACL may include a list of rules that may define access restrictions for interfaces of the network device (e.g., an ingress interface, an egress interface, etc.). In one embodiment, network data may be forwarded to the control plane of the network device, and an ACL can be configured to specify access restrictions to the control plane. The ACL rules may also specify the data to which fields of network data are compared. For example, the ACL rules may indicate values to which the fields of network data should be compared.

In one embodiment, an ACL may be applied to a data packet (e.g., network data, IP packets, etc.) when the data packet is received via an ingress interface. For example when the packet is received from the ingress interface, the forwarding engine 212 may determine whether a packet should be processed by the forwarding engine 212 (e.g., whether the packet should be forwarded to an egress interface). An ACL that is applied at the ingress interface and/or ingress pipeline may be referred to as an ingress ACL. In another embodiment, an ACL may be applied to a data packet when the packet data is about to be forwarded for the forwarding engine 212. For example, before the packet is forwarded by the forwarding engine 212, the forwarding engine 212 may apply the ACL to the data packet just prior to forwarding the data packet to a next hop. An ACL that is applied at the egress interface and/or egress pipeline may be referred to as an egress ACL. ACLs may also be applied to different types of packets and/or routes. For example, an ACL may be applied to IPV4 packets/routes, IPV6 packets, routes, etc. Thus, an ACL may be applied to different combinations of packets/routes and ingress/egress interfaces. For example, an ACL may be applied to IPV6 routes/packets on an egress interface (e.g., may be an IPV6 egress ACL). In another example, an ACL may be applied to IPV4 routes/packets on an ingress interface (e.g., may be an IPV4 ingress ACL)

In some embodiments, the forwarding engine 212 may not be able to support and/or use different types of ACLs. For example, the forwarding engine 212 may not be able to support an IPV6 egress ACL or apply an IPV6 ACL on the egress pipeline (e.g., egress data pipeline 330 illustrated in FIG. 3), but may be able to support an IPV4 ACL on the egress pipeline and/or ingress pipeline. However, the network device may be configured to use an IPV6 egress ACL. For example, the control plane of the network device may indicate that an IPV6 egress ACL should be used on the egress interfaces of the network devices. When a forwarding engine 212 (and/or the network device) is unable to use/apply an egress ACL, the forwarding engine 212 may forward a data packet to a recirculation port (e.g., recirculation port 225 illustrated in FIG. 2). The recirculation port may be used to provide the data packet to the ingress pipeline of the forwarding engine 212. The forwarding engine 212 may use the IPV6 egress ACL in the ingress pipeline to analyze and/or process the data packet. For example, the forwarding engine 212 may use the ingress pipeline to apply the egress ACL. This may allow the forwarding engine 212 to use/apply an egress ACL even though the forwarding engine 212 is unable to support an ACL on the egress pipeline. Providing the data packet to the recirculation port (so that the data packet may be provided back to the ingress pipeline) may be referred to a recirculating a packet.

As discussed above, the network device may allow IPV6 next hops to be used and/or advertised for both IPV4 routes and IPV6 routes. The network device may also use the same entry in the adjacency table 420 for both the IPV4 and IPV6 routes indicated in the LPM table 410. Also as discussed above, an ACL may be applied to different interfaces and/or different types of data packets. In some embodiments, an IPV6 egress ACL may be used by the network device. Because an IPV6 next hop may be used for an IPV4 route (e.g., due to the implementation, use, or support for RFC 5549), the same entry in the adjacency table 420 may be used for both IPV4 packets/routes and IPV6 packets/routes.

In one embodiment, using the same entry in the adjacency table 420 for both IPV4 packets/routes and IPV6 packets/routes may cause problems when an IPV6 egress ACL is used by the network device. As discussed above, the network device may recirculate data packets when an IPV6 egress ACL is used, because the network device may be unable to apply the IPV6 egress ACL in the egress pipeline. For example, IPV6 packets may be recirculated in order to apply the IPV6 egress ACL in the ingress pipeline. However, because IPV4 packets/routes and IPV6 packets/routes may share the same entry in the adjacency table 402, and because IPV4 routes may indicate an IPV6 next hop, IPV4 packets which are forwarded using the same entry, may also be recirculated through the forwarding engine 212, even though the IPV6 egress ACL is not applied to the IPV4 packet. Recirculating IPV4 packets (due to sharing entries in the adjacency table and due to the IPV6 next hops for IPV4 routes/packets) may cause the forwarding engine 212 to forward data packets less efficiently, more slowly, etc. For example, forwarding engine 212 may recirculate IPV4 packets (which have an IPV6 next hop) unnecessarily because the same entry in the adjacency table 420 may be used for both IPV4 and IPV6 routes/packets. This may cause the forwarding engine 212 to take a longer time to forward the data packet (e.g., may increase the latency for forwarding the data packet). This may also cause the forwarding engine 212 to use more resources (e.g., to use more computational resources) because the forwarding engine 212 may reprocess and/or reanalyze IPV4 which may have been unnecessarily recirculated.

Figure 4B:
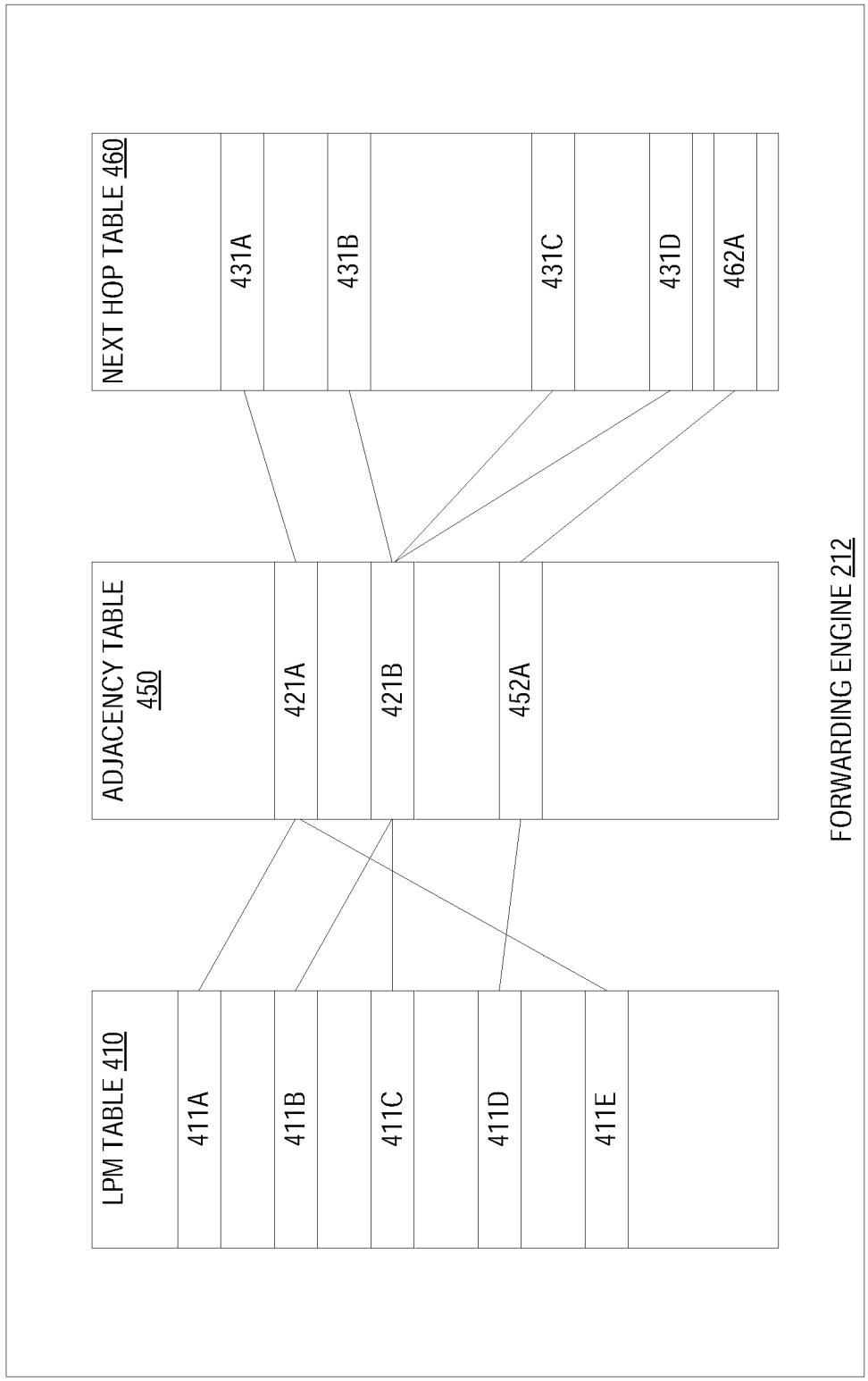
FIG. 4B is a block diagram of an example forwarding engine that includes a longest prefix match table and an adjacency table, in accordance with some embodiments.

FIG. 4B is a block diagram of one embodiment of a forwarding engine 212 that includes a longest prefix match (LPM) table 410, an adjacency table 450, and a next hop table 46-, in accordance with some embodiments. Although the LPM table 410, the adjacency table 450, and the next hop table 460 are illustrated as part of the forwarding engine 212, one or more of the LPM table 410, the adjacency table 450, and the next hop table 460 may be separate from the forwarding engine 212. As discussed above, a network device (e.g., network device 102A illustrated in FIG. 1) may receive a packet via an ingress interface. The incoming packet may have a destination IP address. The network device hardware may identify an entry in the LPM table 410 based on the incoming packets IP address. The entry in the LPM table 410 may indicate an entry or an index into the adjacency table 450. The adjacency table 450 includes information about how to send the packet out of the network device. Each entry in the adjacency table 450 may indicate an entry in the next hop table 460. Each entry in the next hop table 460 may indicate an egress interface on which a packet should to be sent and the next hop network device to which the packet should to be sent in order for it to reach its destination. As illustrated in FIG. 4B, the LPM table 410 may include entries 411A-E. Each of the entries 411A-E may indicate one or more routes that may be associated with a prefix. Entries 411A and E reference entry 421A, entries 411B-C reference entry 421B, and entry 411D references entry 452A. In addition, entry 421A references entry 431A. Entry 421B references entries 431B-D. This may indicate a 3-way ECMP for entry 421B. Entry 452A references entry 462A of the next hop table 460. Each next hop entry 431A-D and 462A may include an outgoing interface of the adjacent network device, such as the MAC address of the adjacent network device.

In one embodiment, the forwarding engine 212 may receive a data packet via the ingress interface of the network device (e.g., may receive an IP packet from a port). The forwarding engine 212 may determine whether the data packet comprises is an IPV4 or an IPV6 packet. For example, the forwarding engine 212 may analyze the source address of the data packet. Based on the type of the packet (and/or other parameters/fields, such as the source address of the packet), the forwarding engine may determine an entry in the LPM table 410. For example, if the packet is an IPV4 packet, the forwarding engine 212 may identify entry 411D in the LPM table 410.

In one embodiment, the forwarding engine may use different entries in the adjacency table 450 based on whether the packet is an IPV4 packet or an IPV6 packet. For example, if the packet is an IPV4 packet, the forwarding engine may identify the entry 452A (which is referenced or indicated by the entry 411D of the LPM table 410). The entry 452A may be associated with an address prefix (e.g., an IP address prefix, a route, etc.) indicated by the entry 411D. The address prefix indicated by the entry 411D (and/or other entries in the LPM table 410) may be associated with an IP address of the data packet. For example, the IP source address of the data packet may fall with a range of IP address indicated by the prefix in entry 411E.

In one embodiment, the entry 452A may indicate a next hop for the data packet. For example, the entry 452A (of the adjacency table 450) may indicate an entry 462A in the next hop table 460. The entry 462A may indicate a next hop for the data packet. For example, the entry 462A may indicate an interface (e.g., a network interface) and/or a network device where the data packet should be forwarded to. The network device (e.g., the forwarding engine 212) may forward the data packet to the next hop indicated in the entry 462A. The next hop indicated by the entry 462A may be an IPV4 next hop.

As discussed above, the forwarding engine may use different entries in the adjacency table 450 and/or LPM table 410 based on whether the packet is an IPV4 packet or an IPV6 packet. For example, if the packet is an IPV6 packet, the forwarding engine 212 may identify entry 411E in the LPM table 410. Based on the entry 411E, the forwarding entry may identify entry 421A in the adjacency table 450. The entry 421A and/or the entry 411E may be associated with an address prefix (e.g., an IP address prefix, a route, etc.) indicated by the entry 411E. The address prefix indicated by the entry 411E (and/or other entries in the LPM table 410) may be associated with an IP address of the data packet.

In one embodiment, the entry 421A may indicate a next hop for the data packet. For example, the entry 421A (of the adjacency table 450) may indicate an entry 431A in the next hop table 460. The entry 431A may indicate a next hop for the data packet. The network device (e.g., the forwarding engine 212) may forward the data packet to the next hop indicated in the entry 431A. The next hop indicated by the entry 431A may be an IPV6 next hop.

As discussed above, the network device may use ACLs to determine how to analyze, process, and/or forward data packets. ACLs may also be applied to different types of packets and/or routes (e.g., IPV4 packets/routes, IPV6 packets/routes, etc.). If the forwarding engine 212 is not able to support or apply an egress ACL (e.g., an IPV6 egress ACL) on the egress pipeline the forwarding engine 212 may forward a data packet to a recirculation port (e.g., recirculation port 225 illustrated in FIG. 2), as discussed above. The recirculation port may be used to provide the data packet to the ingress pipeline of the forwarding engine 212 where the forwarding engine may use the egress ACL in the ingress pipeline.

Also as discussed above, the network device may allow IPV6 next hops to be used and/or advertised for both IPV4 routes and IPV6 routes (e.g., due to the implementation, use, or support for RFC 5549). In addition, an IPV6 egress ACLs may be used in the network device. If the same entry in the adjacency table 450 is used for both IPV4 packets/routes and IPV6 packets/routes, this may cause problems when the IPV6 egress ACL is used by the network device. Because IPV4 packets/routes and IPV6 packets/routes may share the same entry in the adjacency table 402, and because IPV4 routes may indicate an IPV6 next hop, IPV4 packets which are forwarded using the same entry, may also be (unnecessarily) recirculated through the forwarding engine 212. This may cause the forwarding engine 212 to forward data packets less efficiently, more slowly, etc.

However, as illustrated in FIG. 4B, entries 411E and 411D may indicate different entries in the adjacency table 450 (e.g., entries 452A and 421A respectively). Because entries 411D and 452A are associated with IPV4 routes/packets, the next hop for the IPV4 route/packets is indicated by the entry 462A. Because entries 411E and 421A are associated with IPV6 routes/packets, the next hop for the next hop for the IPV6 route/packets is indicated by the entry 431A.

In one embodiment, the entry 452A (which may be associated with IPV4 packets) may be shared with other IPV4 routes and/or next hops. The entry 421A (which may be associated with IPV6 packets) may be shared with other IPV6 routes and/or next hops. However the adjacency table 450 may not use the same entry for both IPV4 and IPV6 packets which forward to the same IPV6 next hop. The adjacency table 450 may use separate entries (e.g., entry 421A and entry 452A) instead.

As discussed above, the forwarding engine 212 and/or the network device may create two separate entries for IPV4 packets and IPV6 packets that should be forwarded to the same IPV6 next hop. In one embodiment, the forwarding engine 212 (and/or network device) may determine whether an IPV6 egress ACL is used in a next hop (e.g., an egress interface) when determining whether to create two separate entries in the adjacency table 450 (for IPV4 packets and IPV6 packets that should be forwarded to the same IPV6 next hop). If an IPV6 egress ACL is not applied and/or used for an egress interface, the network device (e.g., forwarding engine 212) may not create two separate entries in the adjacency table for IPV4 packets and IPV6 packets (e.g., one for IPV4 packets and one for IPV6 packets). If an IPV6 egress ACL is applied and/or used for the egress interface, the network device (e.g., forwarding engine 212) may create two separate entries in the adjacency table for IPV4 packets and IPV6 packets (e.g., one for IPV4 packets and one for IPV6 packets).

In one embodiment, the separate entries 421A and 452A may allow the network device (e.g., the forwarding engine 212) to avoid recirculating a data packet that has an IPV6 next hop. For example, as illustrated in FIG. 4A, if the same entry in the adjacency table 450 is used to determine the next hop for a data packet, this may cause the data packet (e.g., an IPV4 packet) to be recirculated if the next hop for the data packet is an IPV6 next hop and an IPV6 egress ACL is used/applied on the egress interface for the next hop. Separating the entries in the adjacency table 450 and/or the next table 460 for IPV4 packets and for IPV6 packets allows the forwarding engine 212 (e.g., the network device) to avoid recirculating IPV4 packets that indicate an IPV6 next hop through the ingress pipeline because the next hop indicated in entry 462A may not pass through the recirculation port. This may cause the forwarding engine 212 forward the data packet more quickly (e.g., may decrease the latency for forwarding the data packet). This may also cause the forwarding engine 212 to use fewer resources (e.g., to use fewer computational resources) because the forwarding engine 212 may not reprocess and/or reanalyze IPV4 packets which have an IPV6 next hop because the forwarding engine 212 avoids recirculating those IPV4 packets.

Figure 5:
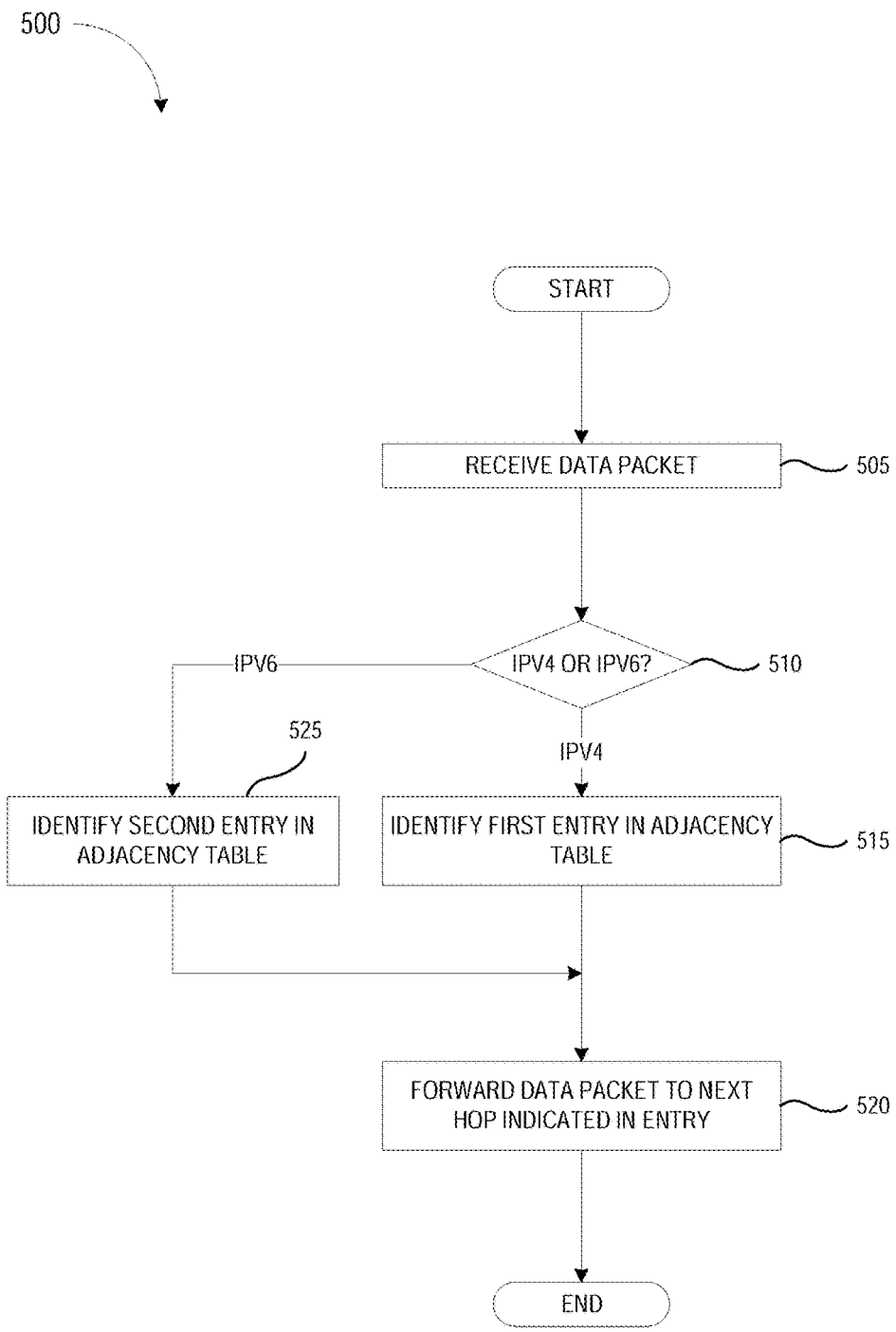
FIG. 5 is a flow diagram of a method of forwarding data, in accordance with some embodiments of the present disclosure.

FIG. 5 is a flow diagram of a method 500 of forwarding data, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), an ASIC, and FPGA, etc.), software (e.g., instructions running/executing on a processing device), firmware (e.g., microcode), or a combination thereof. In some embodiments, method 500 may be performed by a network device (e.g., network device 120 illustrated in FIGS. 1 and 2), a forwarding engine (e.g., forwarding engines 212 illustrated in FIGS. 2 and 3), or a processing device (e.g., processing devices 208 and 214A-C illustrated in FIG. 2). It should be appreciated that the actions of method 500 in FIG. 5 can be performed in differing orders, groupings, or subsets than shown in FIG. 5, for various purposes or user preferences.

Method 500 begins at block 505 where the method 500 may receive a data packet (e.g., may receive an IP packet). The method 500 may determine whether the data packet is an IPV4 packet or an IPV6 packet at block 510. For example, the method 500 may analyze fields (e.g., source address, destination address, etc.) in the data packet. If the data packet is an IPV4 packet, the method 500 may identify a first entry in an adjacency table at block 515. As discussed above, the first entry in the adjacency table may indicate a first entry in a next hop table, which may indicate a next hop for the data packet. The first entry in the adjacency table may be associated with IPV4 packets/routes, as discussed above. The first entry in the adjacency table may also be associated with an address prefix indicated by an entry in a LPM table and the address prefix may be associated with an IP address of the data packet.

If the data packet is an IPV6 packet, the method 500 may identify a second entry in an adjacency table at block 525. As discussed above, the second entry in the adjacency table may indicate a second entry in the next hop table, which may indicate a second next hop for the data packet. The second entry in the adjacency table may be associated with IPV6 packets/routes, as discussed above. The second entry in the adjacency table may also be associated with an address prefix indicated by an entry in a LPM table and the address prefix may be associated with an IP address of the data packet.

At block 520, the method 500 may forward the data packet to the next hop indicated by the first entry in the adjacency table and/or the first entry in the next hop table, or to the next hop indicated by the second entry in the adjacency table and/or the second entry in the next hop table.

As discussed above, using two separate entries in the adjacency table for IPV4 packets and IPV6 packets that may have the same IPV6 next may allow the forwarding engine and/or network device to avoid recirculating the IPV4 packets when an IPV6 egress ACL is used. This may cause the network device and/or forwarding engine to forward the data packet more quickly. This may also allow the network device and/or forwarding engine to use fewer resources (e.g., fewer computational resources).

Figure 6:
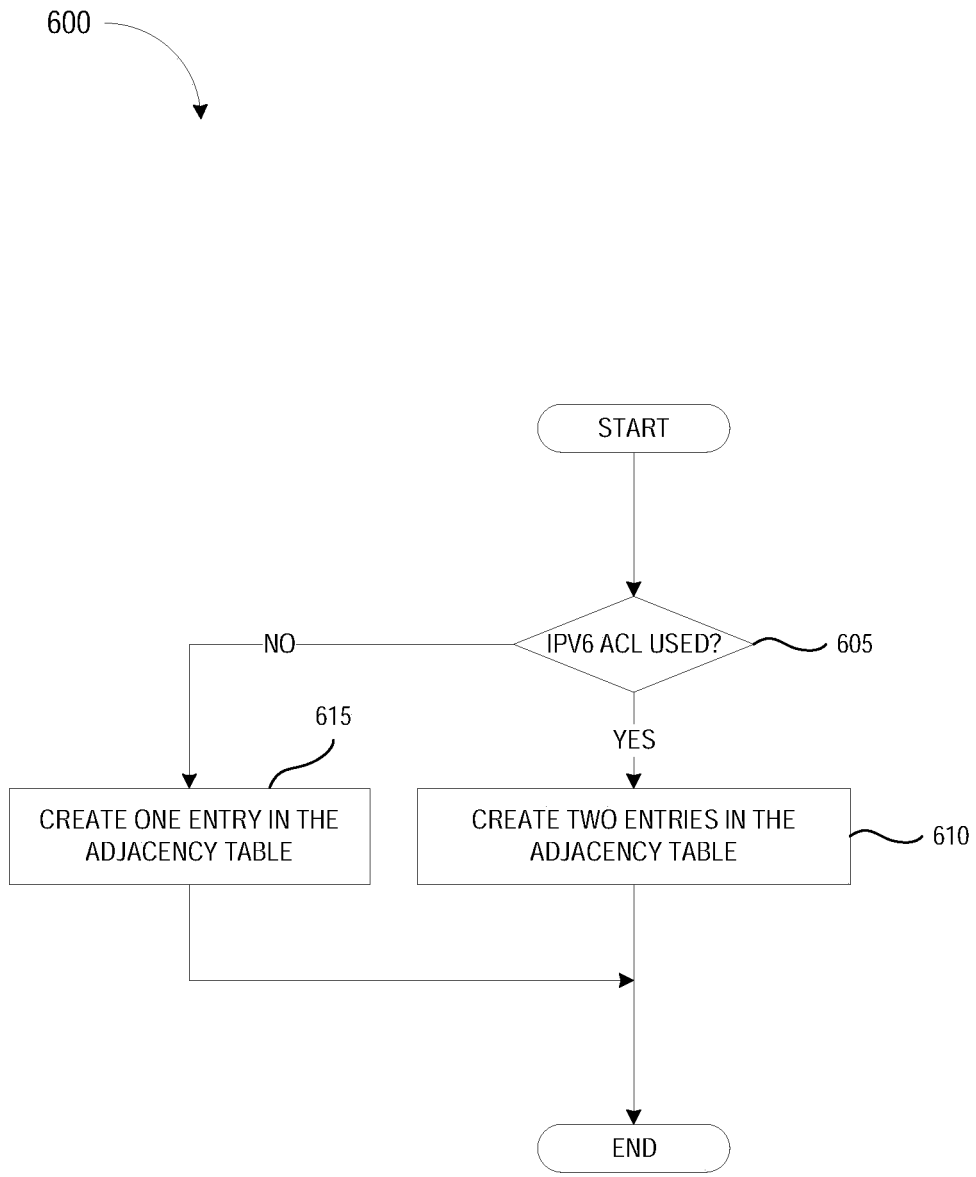
FIG. 6 is a flow diagram of a method of adding one or more entries to an adjacency table, in accordance with some embodiments of the present disclosure.

FIG. 6 is a flow diagram of a method for adding one or more entries to an adjacency table, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), an ASIC, and FPGA, etc.), software (e.g., instructions running/executing on a processing device), firmware (e.g., microcode), or a combination thereof. In some embodiments, method 600 may be performed by a network device (e.g., network device 120 illustrated in FIGS. 1 and 2), a forwarding engine (e.g., forwarding engines 212 illustrated in FIGS. 2 and 3), or a processing device (e.g., processing devices 208 and 214A-C illustrated in FIG. 2). It should be appreciated that the actions of method 600 in FIG. 6 can be performed in differing orders, groupings, or subsets than shown in FIG. 6, for various purposes or user preferences.

Method 600 begins at block 605 where the method 600 determines whether an IPV6 egress ACL is used for and/or applied on an egress interface. If an IPV6 egress ACL is used, the method 600 may create two entries in an adjacency table at block 610. For example, the method 600 may create two entries in an adjacency table for data packets that should be forwarded to the same IPV6 next hop. The first entry may be for IPV4 data packets and the second entry may be for IPV6 data packets, as discussed above. If an IPV6 egress ACL is not used, the method 600 may create one entry in the adjacency table at block 615. For example, the method 600 may create one entry in the adjacency table for both IPV6 and IPV4 data packets that should be forwarded to the same IPV6 next hop.

As discussed above, using two separate entries in the adjacency table for IPV4 packets and IPV6 packets that may have the same IPV6 next hop may allow the forwarding engine and/or network device to avoid recirculating the IPV4 packets when an IPV6 egress ACL is used. This may cause the network device and/or forwarding engine to forward the data packet more quickly. This may also allow the network device and/or forwarding engine to use fewer resources (e.g., fewer computational resources). By determine whether an IPV6 egress ACL is used, the network device may be able to reduce the number of entries that are in the adjacency table and/or LPM table. For example, if an IPV6 egress ACL is not used, then method 600 may create one less entry in the adjacency table.

Figure 7:
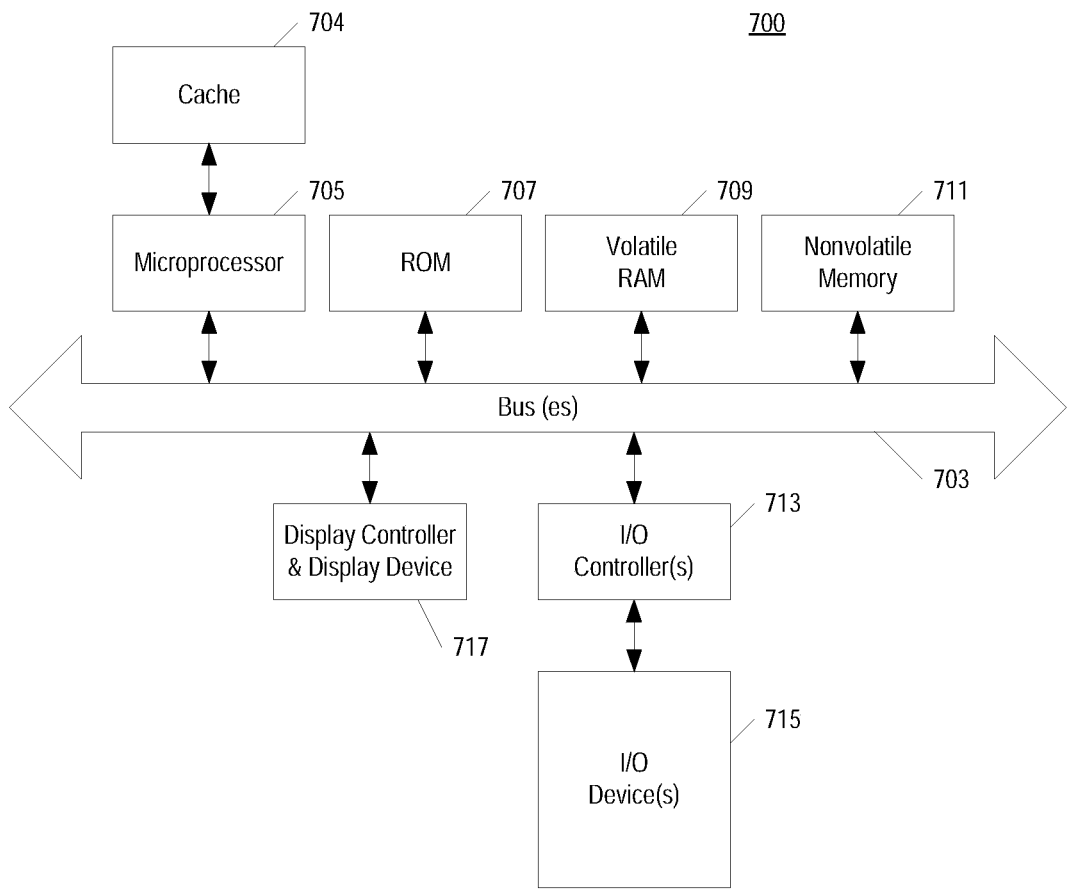
FIG. 7 is a block diagram of an example a computing device, in accordance with some embodiments.

FIG. 7 shows an example computing device 700, in accordance with some embodiments. For example, the computing device 700 may be implemented including a network device 100 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computing device 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. In one embodiment, the computing device 700 includes a plurality of network interfaces of the same or different type (e.g., Ethernet copper interface, Ethernet fiber interfaces, wireless, and/or other types of network interfaces). In this embodiment, the computing device 700 can include a forwarding engine to forward network data received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD ROM/RAM or a flash memory or other types of memory systems, which maintains data (e.g., large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
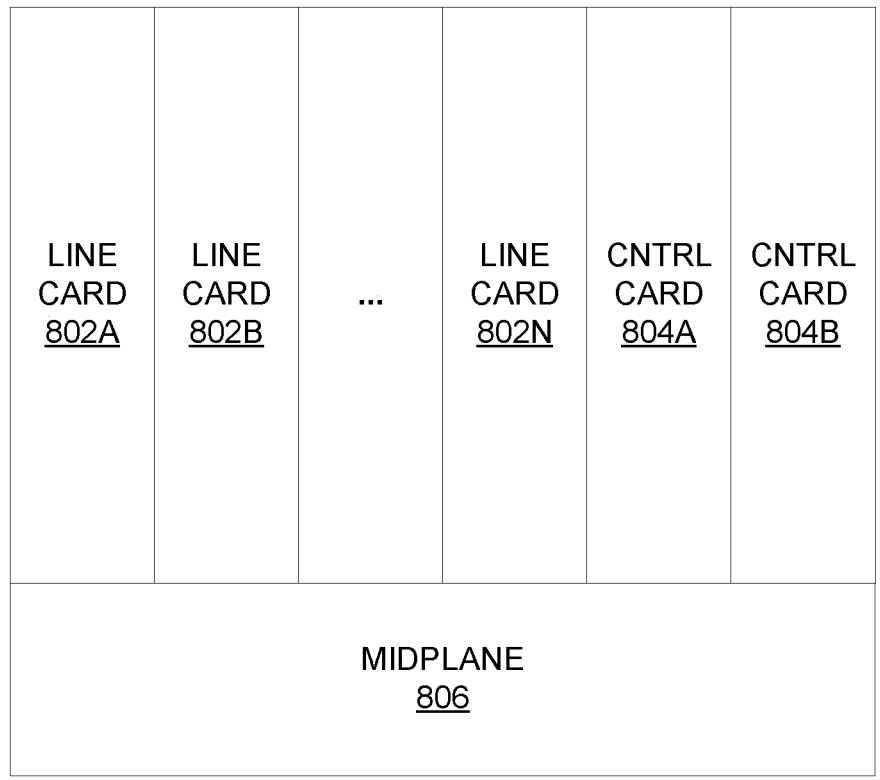
FIG. 8 is a block diagram of one embodiment of an exemplary network device, in accordance with some embodiments.

FIG. 8 is a block diagram of one embodiment of exemplary network device 800, in accordance with some embodiments. In FIG. 8, the midplane 808 couples to the line cards 802A-N and controller cards 804A-B. The midplane 808 may also be referred to as a fabric. While in one embodiment, the controller cards 804A-B control the processing of the traffic by the line cards 802A-N, in alternate embodiments, the controller cards 804A-B, perform the same and/or different functions (e.g., updating a software image on the network device, etc.). In one embodiment, the line cards 802A-N process and forward traffic according to the network policies received from the controller cards 804A-B. In one embodiment, the controller cards 804A-B may include containers, operating systems, and/or agents, as discussed above. It should be understood that the architecture of network device 800 illustrated in FIG. 8 is exemplary, and different combinations of cards may be used in other embodiments.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two blocks in a figure shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of forwarding data within a network device, comprising:
    upon determining that an Internet Protocol version 6 (IPv6) egress ACL cannot be applied at an egress interface of the network device, creating two entries in an adjacency table for data packets to be forwarded to same IPv6 next hop, wherein a first entry of the two entries is for Internet Protocol version 6 (IPv6) data packets and a second entry of the two entries is for Internet Protocol version 4 (IPv4) data packets;
    upon receiving an IPv6 data packet at an ingress interface of the network device to be forwarded to the same IPv6 next hop, recirculating the IPv6 data packet to the ingress interface of the network device using the first entry in the adjacency table; and
    upon receiving an IPv4 data packet at the ingress interface of the network device to be forwarded to the same IPv6 next hop, forwarding the IPv4 data packet to the same IPv6 next hop using the second entry in the adjacency table.

2. The method of claim 1, wherein upon determining that the IPV6 egress ACL is not used at the egress interface of the network device:
    reducing the two entries in the adjacency table to a single entry; and
    using the single entry for forwarding both IPv6 data packets and IPv4 data packets to the same next hop.

3. The method of claim 1, further comprising applying the egress ACL at the ingress interface of the network device to the IPv6 data packet that is recirculated to the ingress interface of the network device.

4. The method of claim 3, wherein applying the egress ACL to the IPv6 data packet at the ingress interface results in a rule of the ACL directing the IPV6 packet to a neighboring network device as the next hop.

5. The method of claim 3, wherein, applying the egress ACL to the IPV6 packet at the ingress interface of the network device comprises:
    parsing the IPV6 data packet to extract one or more fields of a header of the IPV6 data packet; and
    using the one or more fields to determine the next hop for the IPV6 data packet.

6. The method of claim 1, wherein the IPv6 data packet is recirculated to the ingress interface through the network device via a recirculation interface.

7. The method of claim 1, wherein the first entry in the adjacency table maps to a first entry in the next hop table and the second entry in the adjacency table maps to a second entry in the next hop table.

8. The method of claim 1, wherein the first entry in the adjacency table maps to a first egress interface and the second entry in the adjacency table maps to a second egress interface, wherein the first egress interface is used for forwarding IPV6 data packets to a neighboring network device and the second egress interface is used for forwarding IPV4 data packets to the neighboring network device.

9. The method of claim 1, wherein the adjacency table includes a mapping to an immediate neighboring networking device that is the next hop from the network device.

10. The method of claim 1, wherein the network device applies an IPV4 access control list for the egress interface.

11. A network device, comprising:
    a memory to store data; and
    a processing device coupled to the memory, the processing device to:
        upon determining that an Internet Protocol version 6 (IPv6) egress ACL cannot be applied at an egress interface of the network device, create two entries in an adjacency table for data packets to be forwarded to same IPv6 next hop, wherein a first entry of the two entries is for Internet Protocol version 6 (IPv6) data packets and a second entry of the two entries is for Internet Protocol version 4 (IPv4) data packets;
        upon receiving an IPv6 data packet at an ingress interface of the network device to be forwarded to the same IPv6 next hop, recirculate the IPv6 data packet to the ingress interface of the network device using the first entry in the adjacency table; and
        upon receiving an IPv4 data packet at the ingress interface of the network device to be forwarded to the same IPv6 next hop, forward the IPv4 data packet to the same IPv6 next hop using the second entry in the adjacency table.

12. The network device of claim 11, wherein upon determining that the IPV6 egress ACL is not used at the egress interface of the network device, creating a single entry in the adjacency table for data packets to be forwarded to the same IPv6 next hop, wherein the created single entry is used for forwarding both IPv6 data packets and IPv4 data packets to the next hop.

13. The network device of claim 11, further comprising applying the egress ACL at the ingress interface of the network device to the IPv6 data packet that is recirculated to the ingress interface of the network device.

14. The network device of claim 13, wherein applying the egress ACL to the IPv6 data packet at the ingress interface results in a rule of the ACL directing the IPV6 packet to a neighboring network device as the next hop.

15. The network device of claim 11, wherein the IPv6 data packet is recirculated to the ingress interface through the network device via a recirculation interface.

16. The network device of claim 11, wherein the first entry in the adjacency table maps to a first entry in the next hop table and the second entry in the adjacency table maps to a second entry in the next hop table.

17. The network device of claim 11, wherein the first entry in the adjacency table maps to a first egress interface and the second entry in the adjacency table maps to a second egress interface, wherein the first egress interface is used for forwarding IPV6 data packets to a neighboring network device and the second egress interface is used for forwarding IPV4 data packets to the neighboring network device.

18. A non-transitory machine-readable medium having executable instructions to cause one or more processing devices to perform a method comprising:
    upon determining that an Internet Protocol version 6 (IPv6) egress ACL cannot be applied at an egress interface of the network device, creating two entries in an adjacency table for data packets to be forwarded to same IPv6 next hop, wherein a first entry of the two entries is for Internet Protocol version 6 (IPv6) data packets and a second entry of the two entries is for Internet Protocol version 4 (IPv4) data packets;
    upon receiving an IPv6 data packet at an ingress interface of the network device to be forwarded to the same IPv6 next hop, recirculating the IPv6 data packet to the ingress interface of the network device using the first entry in the adjacency table; and
    upon receiving an IPv4 data packet at the ingress interface of the network device to be forwarded to the same IPv6 next hop, forwarding the IPv4 data packet to the same IPv6 next hop using the second entry in the adjacency table.

19. The non-transitory machine-readable medium of claim 18, the method further comprising applying the egress ACL at the ingress interface of the network device to the IPv6 data packet that is recirculated to the ingress interface of the network device, wherein applying the egress ACL to the IPv6 data packet includes selecting a next hop for the IPV6 Packet.

20. The non-transitory machine-readable medium of claim 19, wherein applying the egress ACL to the IPv6 data packet at the ingress interface results in a rule of the ACL directing the IPV6 packet to a neighboring network device as the next hop.

* * * * *